United States Patent [19]
Morris et al.

[11] Patent Number: 6,080,307
[45] Date of Patent: Jun. 27, 2000

[54] STORM DRAIN SYSTEMS FOR FILTERING TRASH AND HYDROCARBONS

[75] Inventors: James F. Morris; Stephen C. Stelpstra; Mark Thurman Kahn, all of Tucson; Stephen F. Pegler; Scott L. Larsen, both of Scottsdale, all of Ariz.

[73] Assignee: Abtech Industries, Inc., Scottsdale, Ariz.

[21] Appl. No.: 09/162,695

[22] Filed: Sep. 29, 1998

Related U.S. Application Data

[60] Provisional application No. 60/060,565, Sep. 30, 1997.

[51] Int. Cl.[7] .............................. E03F 5/06; B01D 39/00
[52] U.S. Cl. .................. 210/163; 210/238; 210/283; 210/484; 210/498; 210/502.1; 210/908; 404/4
[58] Field of Search ................................ 210/163–165, 210/170, 238, 283, 295, 299, 315, 335, 339, 448, 452, 459, 484, 497.01, 498, 502.1, 908, 693; 404/2, 4, 5

[56] References Cited

U.S. PATENT DOCUMENTS

| | | |
|---|---|---|
| Re. 29,996 | 5/1979 | Jordan et al. .......................... 210/281 |
| 248,559 | 10/1881 | Jackson . |
| 425,641 | 4/1890 | Van De Walle . |
| 543,740 | 7/1895 | Kuhns . |
| 1,032,700 | 7/1912 | Pickett . |
| 1,164,527 | 12/1915 | Kelly, Jr. . |
| 1,274,227 | 1/1918 | Woodson . |
| 1,471,819 | 10/1923 | Bauschard . |

(List continued on next page.)

FOREIGN PATENT DOCUMENTS

| | | |
|---|---|---|
| 0484061-A1 | 5/1992 | European Pat. Off. . |
| 0518336-A1 | 12/1992 | European Pat. Off. . |
| 136162 | 6/1979 | Germany . |
| 2904428 | 8/1980 | Germany . |
| 3122219-A1 | 6/1981 | Germany . |
| 3634289 | 4/1988 | Germany . |
| 4-371203 | 12/1992 | Japan . |
| 7109 | 10/1905 | United Kingdom . |
| 13514 | 7/1983 | United Kingdom . |
| WO 97/44279 | 11/1997 | WIPO . |
| WO 98/30303 | 7/1998 | WIPO . |

OTHER PUBLICATIONS

"Block Copolymers," *Polymer Handbook,* p. 34 (Wiley, 3$^{rd}$ Edition 1989).

(List continued on next page.)

*Primary Examiner*—David A. Simmons
*Assistant Examiner*—Fred Prince
*Attorney, Agent, or Firm*—Louis J. Hoffman

[57] ABSTRACT

A storm-drain insert has separate collection systems for trash and oil or other hydrocarbons. A tilted grate separates trash from oily inlet water and directs the trash to a separate basket, and the water flows through a corrugated, flexible canister containing a hydrophobic, compliant, oil-absorbent, copolymer material arranged in a number of bodies having high surface area. Preferably, the material is formed with a binder in a novel extrusion process. The inserts can be suspended in a storm drain adjacent to a curb inlet.

20 Claims, 2 Drawing Sheets

U.S. PATENT DOCUMENTS

| | | | |
|---|---|---|---|
| 1,935,642 | 11/1933 | Laughlin | 210/45 |
| 2,467,021 | 4/1949 | Fischer | 210/44 |
| 2,557,079 | 6/1951 | Cutri | 294/77 |
| 2,813,745 | 11/1957 | Frieder et al. | 294/77 |
| 2,889,928 | 6/1959 | Sisk . | |
| 3,147,216 | 9/1964 | Oemler | 210/693 |
| 3,221,888 | 12/1965 | Muller | 210/333 |
| 3,246,582 | 4/1966 | Wade et al. . | |
| 3,324,630 | 6/1967 | Teller et al. | 55/90 |
| 3,415,745 | 12/1968 | Isaacson | 210/54 |
| 3,494,862 | 2/1970 | Horowitz | 210/693 |
| 3,518,183 | 6/1970 | Evans | 210/40 |
| 3,536,616 | 10/1970 | Kondoh et al. | 210/693 |
| 3,537,587 | 11/1970 | Kain | 210/242 |
| 3,538,020 | 11/1970 | Heskett et al. | 210/496 |
| 3,539,013 | 11/1970 | Smith | 210/242 |
| 3,565,257 | 2/1971 | Cavalieri | 210/242 |
| 3,567,660 | 3/1971 | Winkler | 260/2.3 |
| 3,594,335 | 7/1971 | Schultz et al. | 260/2.5 |
| 3,607,741 | 9/1971 | Sohnius | 210/242.4 |
| 3,607,793 | 9/1971 | Mahlman | 260/93.7 |
| 3,617,565 | 11/1971 | Fahlvik | 210/691 |
| 3,617,566 | 11/1971 | Oshima et al. | 210/242.4 |
| 3,667,235 | 6/1972 | Preus et al. | 61/1 |
| 3,667,608 | 6/1972 | Burroughs et al. | 210/242 |
| 3,679,058 | 7/1972 | Smith | 210/242 |
| 3,681,237 | 8/1972 | Orban | 210/680 |
| 3,702,657 | 11/1972 | Cunningham et al. | 210/242 |
| 3,739,913 | 6/1973 | Bogosian | 210/924 |
| 3,756,948 | 9/1973 | Weinberg | 210/693 |
| 3,783,621 | 1/1974 | Preus et al. | 61/1 F |
| 3,800,950 | 4/1974 | Hess et al. | 210/242.4 |
| 3,831,760 | 8/1974 | Economy et al. | 210/242 |
| 3,837,494 | 9/1974 | Stevenson | 210/259 |
| 3,868,322 | 2/1975 | Orloff | 210/108 |
| 3,888,766 | 6/1975 | DeYoung | 210/693 |
| 3,915,859 | 10/1975 | Sundin et al. | 210/104 |
| 3,916,969 | 11/1975 | Auerbach et al. | 152/354 |
| 3,923,472 | 12/1975 | Martinez et al. | 44/50 |
| 3,929,631 | 12/1975 | Winkler | 210/36 |
| 4,002,177 | 1/1977 | Rainer et al. | 131/10 R |
| 4,031,839 | 6/1977 | Pedone | 114/270 |
| 4,039,489 | 8/1977 | Fletcher et al. | 210/924 |
| 4,052,306 | 10/1977 | Schwartz et al. | 210/242 S |
| 4,060,487 | 11/1977 | Samsel | 210/923 |
| 4,061,807 | 12/1977 | Shaler et al. | 210/502 |
| 4,065,923 | 1/1978 | Preus | 61/1 F |
| 4,070,287 | 1/1978 | Wiegand et al. | 210/693 |
| 4,084,380 | 4/1978 | Hallhagen | 61/1 F |
| 4,099,619 | 7/1978 | Hudler et al. | 206/524.1 |
| 4,102,783 | 7/1978 | Zenno et al. | 210/36 |
| 4,111,813 | 9/1978 | Preus | 210/282 |
| 4,206,080 | 6/1980 | Sato et al. | 252/430 |
| 4,207,378 | 6/1980 | Klein | 428/402 |
| 4,248,758 | 2/1981 | Wright | 260/33.6 |
| 4,261,823 | 4/1981 | Gallagher et al. . | |
| 4,264,444 | 4/1981 | Bronnec | 210/923 |
| 4,332,854 | 6/1982 | Parker | 210/924 |
| 4,366,067 | 12/1982 | Golding et al. | 210/67 I |
| 4,401,475 | 8/1983 | Eriksson et al. | 210/924 |
| 4,419,232 | 12/1983 | Arntyr et al. . | |
| 4,420,400 | 12/1983 | Weitzen | 210/710 |
| 4,427,157 | 1/1984 | Klein | 210/160 |
| 4,429,065 | 1/1984 | Gancy . | |
| 4,439,324 | 3/1984 | Crotti | 210/924 |
| 4,454,039 | 6/1984 | McCoy . | |
| 4,497,663 | 2/1985 | Fisher et al. | 134/4 |
| 4,497,712 | 2/1985 | Crowling | 210/242.4 |
| 4,519,431 | 5/1985 | Yoshimura et al. | 152/209 R |
| 4,519,918 | 5/1985 | Ericsson et al. | 210/680 |
| 4,560,718 | 12/1985 | Ritchey | 524/13 |
| 4,592,690 | 6/1986 | Busch | 413/19 |
| 4,594,157 | 6/1986 | McGowan | 210/163 |
| 4,640,730 | 2/1987 | Streets et al. | 156/334 |
| 4,672,781 | 6/1987 | Pichon | 52/94 |
| 4,737,394 | 4/1988 | Zafiroglu | 210/694 |
| 4,740,435 | 4/1988 | Markin et al. | 429/174 |
| 4,801,386 | 1/1989 | Sugimori et al. | 210/680 |
| 4,919,820 | 4/1990 | Lafay et al. | 210/671 |
| 4,929,349 | 5/1990 | Beckman | 210/151 |
| 4,941,978 | 7/1990 | Gabrick | 210/693 |
| 4,965,129 | 10/1990 | Bair et al. | 210/924 |
| 4,980,229 | 12/1990 | Park et al. | 428/327 |
| 5,009,790 | 4/1991 | Bustamante et al. | 210/242.4 |
| 5,032,640 | 7/1991 | Fachini | 524/426 |
| 5,037,541 | 8/1991 | Ruey-Jang et al. . | |
| 5,071,564 | 12/1991 | Stein et al. | 210/924 |
| 5,075,014 | 12/1991 | Sullivan | 210/776 |
| 5,104,548 | 4/1992 | Gabrick | 210/680 |
| 5,133,619 | 7/1992 | Murfae et al. | 404/4 |
| 5,135,578 | 8/1992 | Billings | 210/924 |
| 5,135,660 | 8/1992 | Chromecek et al. | 210/671 |
| 5,159,016 | 10/1992 | Inoue et al. | 525/92 |
| 5,165,821 | 11/1992 | Fischer et al. | 405/63 |
| 5,173,182 | 12/1992 | Debellian | 210/170 |
| 5,179,611 | 1/1993 | Umeda et al. | 385/110 |
| 5,181,802 | 1/1993 | Thengs et al. | 405/70 |
| 5,186,831 | 2/1993 | DePetris | 210/924 |
| 5,207,901 | 5/1993 | Ravagnan | 210/173 |
| 5,211,858 | 5/1993 | Donvan et al. | 252/8.551 |
| 5,227,072 | 7/1993 | Brinkley | 210/924 |
| 5,232,587 | 8/1993 | Hegemier et al. | 210/162 |
| 5,248,729 | 9/1993 | Inoue et al. | 525/92 |
| 5,252,215 | 10/1993 | McFarlane et al. | 210/69.1 |
| 5,256,226 | 10/1993 | Marzola et al. | 156/95 |
| 5,278,217 | 1/1994 | Umeda et al. | 524/394 |
| 5,281,463 | 1/1994 | Cotton | 428/126 |
| 5,297,367 | 3/1994 | Sainz . | |
| 5,304,311 | 4/1994 | Codiglia | 210/693 |
| 5,324,429 | 6/1994 | Holland | 210/484 |
| 5,330,651 | 7/1994 | Robertson | 210/617 |
| 5,360,548 | 11/1994 | Stein et al. | 210/693 |
| 5,364,535 | 11/1994 | Buckalew | 210/671 |
| 5,374,600 | 12/1994 | Hozumi et al. | 502/402 |
| 5,405,539 | 4/1995 | Schneider | 210/747 |
| 5,407,575 | 4/1995 | Vinsonhaler | 210/924 |
| 5,414,029 | 5/1995 | Lemonie et al. | 524/60 |
| 5,423,985 | 6/1995 | Addeo et al. | 210/924 |
| 5,428,085 | 6/1995 | Burel et al. | 524/59 |
| 5,430,474 | 7/1995 | Emery | 210/163 |
| 5,432,000 | 7/1995 | Young, Sr. et al. | 428/372 |
| 5,439,590 | 8/1995 | Steffan | 210/616 |
| 5,468,539 | 11/1995 | Crivelli | 428/141 |
| 5,480,254 | 1/1996 | Autry et al. | 404/2 |
| 5,496,865 | 3/1996 | Heese et al. | 521/79 |
| 5,516,845 | 5/1996 | Heese et al. | 525/193 |
| 5,573,349 | 11/1996 | Paoluccio | 405/52 |
| 5,624,576 | 4/1997 | Lenhart et al. | 210/767 |
| 5,632,889 | 5/1997 | Tharp | 210/165 |
| 5,641,847 | 6/1997 | Hozumi et al. | 526/328.5 |
| 5,707,527 | 1/1998 | Knutson et al. | 210/660 |
| 5,712,358 | 1/1998 | Sojka | 526/323.2 |
| 5,720,574 | 2/1998 | Barella | 405/52 |
| 5,725,782 | 3/1998 | Chinn et al. | 21/767 |
| 5,744,048 | 4/1998 | Stetler | 210/803 |
| 5,762,790 | 6/1998 | Zoeller | 210/238 |
| 5,767,060 | 6/1998 | Hanrahan | 210/502.1 |
| 5,788,849 | 8/1998 | Hutter, Jr. et al. | 210/163 |
| 5,820,762 | 10/1998 | Bamer et al. | 210/661 |
| 5,830,967 | 11/1998 | Sojka | 526/323.2 |
| 5,834,577 | 11/1998 | Sojka | 526/323.2 |
| 5,849,198 | 12/1998 | Sharpless | 210/693 |

| | | | |
|---|---|---|---|
| 5,863,440 | 1/1999 | Rink | 210/693 |
| 5,869,555 | 2/1999 | Simmons et al. | 524/229 |
| 5,955,552 | 9/1999 | Sojka | 526/88 |
| 5,958,226 | 9/1999 | Fleischmann . | |

OTHER PUBLICATIONS

"Selection Criteria and Laboratory Evaluation of Oilspill Sorbents," *Environmental Protection Series*, Report EPS 3/SP/3, pp. 1–73 (Jun. 1991).

"Environmental Spill Encapsulant Polymers," *JRM Chemical Form 550 product brochure* (Aug. 1993).

Rushefsky, "Old Tires Now Can Now Be Recycled," *Staten Island Advance* (Oct. 22, 1993).

"Titan Tech Attacks Tire Recycling Mess," *American Metal Market* (Oct. 26, 1993).

Alexander, "Bradley is Center of World Attention this Week" *Chickasha Daily Express* (Nov. 4, 1993).

"Business & Technology," *Solid Waste Report*, vol. 24, No. 43, p. 346 (Nov. 4, 1993).

"A Cooler Way to Melt Junked Tires," *Business Week* (Nov. 8, 1993).

Schulman, "A New Spin on Old Tires," *Newsweek* (Nov. 15, 1993).

"Titan Develops Tyre & Plastics Recycling," *HazNews* (Dec. 1993).

Kokish, "Titan Opens Pyrolysis Plants in South Korea," *Tire Business* (Dec. 13, 1993).

Metz, "N.M. Firm is Ready to Roll into the Tire Recycling Industry," *The Boston Globe* (Dec. 28, 1993).

"High–Tech Breakthroughts," *Boardroom Reports* (Jan. 1, 1994).

Kansas "Catalysts and Beams Take Aim at Wastes," *The Wall Street Journal* (Jan. 21, 1994).

"Recycling News," *Green Alternatives*, vol. 4, No. 1 (Feb./Mar. 1994).

"Titan Technologies, Inc.," *Conservative Speculator* (Jun. 1994).

"Titan Technologies, Inc.," *Investor's NewsWire*, p. All (Sep. 9, 1994).

Titan Technologies, Inc. Investor's Booklet.

Pacific Fluid System, Corp. "Linductor Oil Recovery and Bulk Transfer System Booklet."

DiChristina, "Mired in Tires," *Popular Science* (Oct. 1994).

McDonagh, et al., "Handling and Disposal of Oil Waste from Oil Spills at Sea," paper presented at Long Beach Oil Spill Conference (Feb. 27, 1995).

Cassidy, "Titan Potential," *MoneyWorld* (Apr. 1995), pp. 18–21.

"Petrosorb HGPPL–1 Petroleum Product Spill Encapsulant," *Petrosorb product brochure* (Feb. 27, 1995).

"Fact Sheets," *Team One USA Challenger Product Information*. (Feb. 27, 1995).

Fingas, Mervis F., et al. "The Newfoundland Offshore Burn Experiment–Nobe." (Feb. 27, 1995).

Buist, Ian A., et al. "In–Situ Burning of Alaska North Slope Emulsions," (Feb. 27, 1995).

Guenette, Chantal, et al. "Studies of In–Situ Burning of Emulsions in Norway." (Feb. 27, 1995).

PCT Int'l Prelim. Exam. Report, S.N. PCT/US98/00385 (May 20, 1999).

Kristar Enterprises, Fossil Filter, brochure (Sep. 1996).

Fam, Sami, Michael E. Stenstron, and Gary Silverman, "Hydrocarbons in Urban Runoff," *Journal of Environmental Engineering*, vol. 113, No. 5, Oct. 1987, pp. 1032–1046.

Shepp, David L., "Petroleum Hydrocarbon Concentrations Observed in Runoff from Discrete, Urbanized Automotive–Intensive Land Uses," *Watershed '96 Conference Proceedings*, pp. 220–223.

Materials re: King County Evaluation of Commercially Available Catch Basin Inserts for Treatment of Stormwater Runoff from Developed Sites, Oct. 1995.

Imtech–Imbibitive Technologies Corportion product literature re "Imbiber Beads," 1993, 1996, 1997.

"HydroCartridges/Rubberizer" product literature, 1994–97.

Aqua Treatment Systems, Inc./"Absorbent W" product literature, 1996–97.

"Innovative Stormwater Treatment Products & Services Guide," prepared for the Stormwater Technologies Trade Shows, Nov. 17 & 19, 1997 (discussing several products, some of which were commercially available before Sep. 1997).

Suntree Isles, Inc. "Curb Inlet Basket" product literature, 1995–96 (and see item A above).

Inventive Resources, Inc. "Water Decontaminator" product literature (Apr. 1998 and see item B above).

"First in Thirst," *Matasorb Industrial Sorbents product brochure* (source and date unknown).

STORM DRAIN SYSTEMS FOR FILTERING TRASH AND HYDROCARBONS

CROSS-REFERENCED RELATED APPLICATIONS

This application claims the benefit of U.S. Provisional Application No. 60/060,565, filed Sep. 30, 1997.

FIELD OF THE INVENTION

This invention is in the field of systems and methods for separating trash and hydrocarbons from water that passes into storm drains, such as runoff from city streets.

BACKGROUND OF THE INVENTION

A large volume of trash, including leaves, twigs, plastic or paper cups, cigarette butts, and wrappers, and the like, pass into storm drains adjacent to paved surfaces such as streets and parking lots, such as through curb inlets.

Larger spills of oil can also flow into storm drains, such as from loading docks, gas stations, and the like. In addition, quantities of oil or other hydrocarbons are frequently spilled on the ground and subsequent water flow, such as from rain, can cause the oil to flow into storm drains. This is referred to as "non-point-source pollution."

The volume of oil from non-point-source pollution in typical water runoff is surprisingly large. For example, a government study in one published article showed that stormwater sampled from street sites contained an "event mean concentration" of 2.2 mg. of oil per liter of runoff water. Shepp, "Petroleum Hydrocarbon Concentrations Observed in Runoff from Discrete, Urbanized Automotive-Intensive Land Uses," Watershed '96. If one meter of rain per year falls on a street 10 meters wide, then at that observed mean rate, the annual runoff from each kilometer of street will contain about 275 liters of hydrocarbons. Moreover, other studies of non-point-source pollution have measured oil concentrations an order of magnitude higher at some locations. Spills can increase the volume of oil even more.

The result of such problems include enormous annual costs, both financial and environmental, by contaminating natural receiving waters.

Known systems typically use a screen-type filter through which the water runoff passes. However, such systems are prone to becoming clogged with debris, thereby blocking the inlet to the storm drain. Also, such systems can collect only limited quantities of oil.

There has been a need for some time for trash and oil recovery systems that would (1) contain oil quickly and permanently, (2) prevent inlets from being clogged with debris, and (3) to permit removal of trash and oil for disposal.

Accordingly, it is a primary object of the present invention to achieve a more effective system for recovering trash and oil from water passing into storm drains or the like.

It is another object of the invention to provide methods and apparatus for effectively containing oil spills flowing into storm drains, over a range of flow rates.

It is another object of the invention to provide methods and apparatus for ameliorating oil spills by entrapping the oil in an oil-sorbent material.

It is another object of the invention to provide a means of improving the collection of spilled oil.

It is another object of the invention to provide collection systems that do not cause debris clogs.

The present invention achieves the above and other objectives by use of a stormdrain insert with separate collection systems for trash and oil or other hydrocarbons. A tilted grate separates trash from oily inlet water and directs the trash to a separate basket, and the water flows through a corrugated, flexible canister containing a hydrophobic, compliant, oil-absorbent, copolymer material arranged in a number of bodies having high surface area. Preferably, the material is formed with a binder in a novel extrusion process. The inserts can be suspended in a storm drain adjacent to a curb inlet.

Other aspects of the invention will be appreciated by those skilled in the art after a reading of the detailed disclosure of the present invention below.

BRIEF DESCRIPTION OF THE DRAWINGS

Common numerals are used in the several figures to indicate similar elements.

DETAILED DESCRIPTION

The system includes the use of a quantity of appropriately formed bodies comprising copolymer-based materials that absorb and entrap crude or refined hydrocarbon products, including crude oil of any viscosity and gasoline or other refined fuels. For purposes of this application, the term "oil" refers to any hydrocarbon material.

Figure 1:
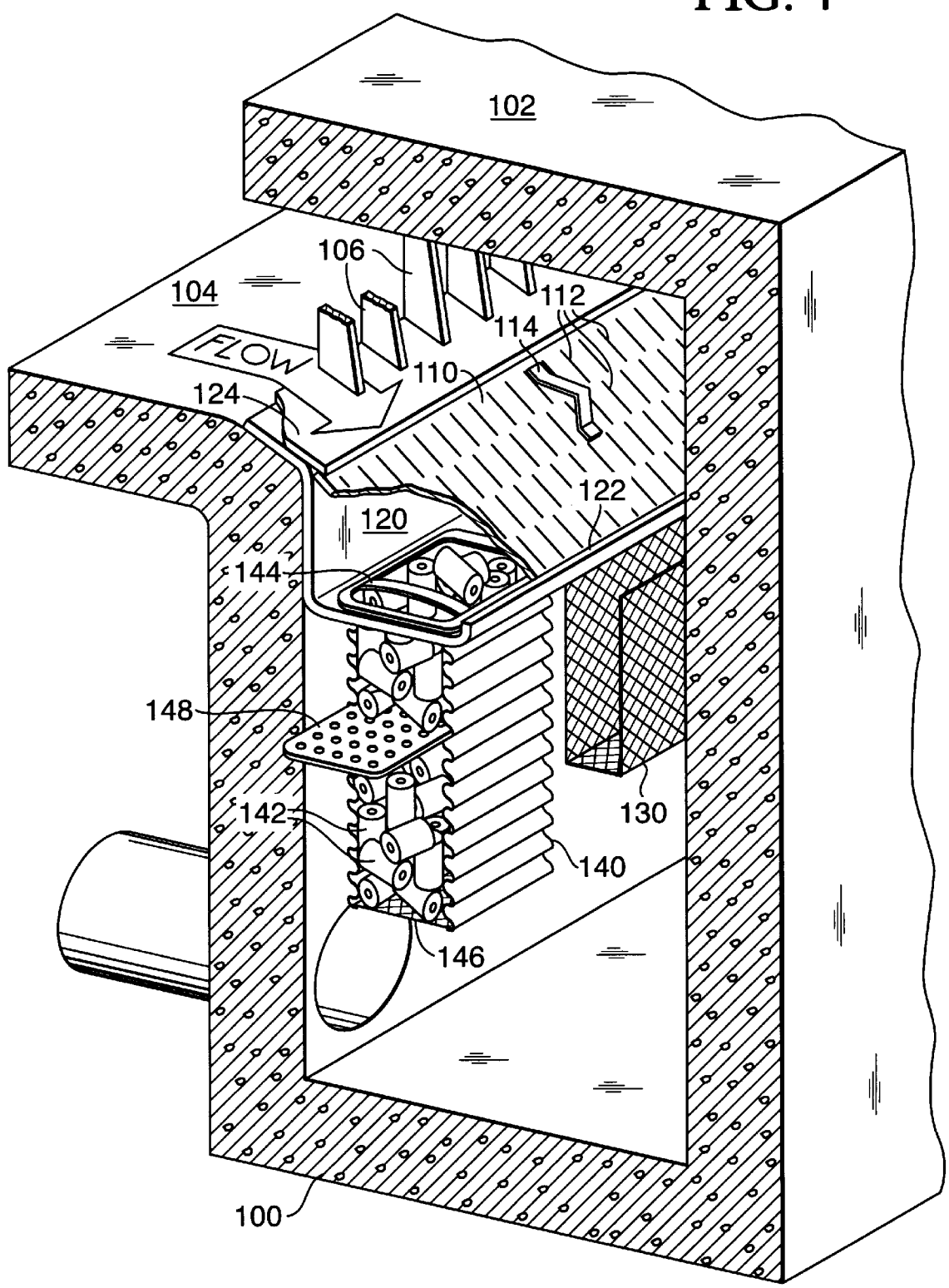
FIG. 1 is a perspective, cut-away view of a storm drain with the inventive system installed.

The inventive system is designed to collect trash and oil spilled and flowing into a fluid receptacle such as storm drain 100 shown in FIG. 1. Storm drain 100 can be part of a municipal sewer or waste water system or any private collection system, such as at a gas station.

Frequently, as shown in FIG. 1, storm drain 100 is of a sort placed under sidewalk 102 at the margin of street or roadway 104. Grate 106 is placed in a gap in a curb (not shown) connecting sidewalk 102 and the gutter of street 104. Grate 106 may be fashioned of vertical slats, as shown, or alternatively vertical bars, or even may be omitted entirely in favor of a small opening to storm drain 100. Preferably, grate 106 is removable by city workers for maintenance or retrofitting of the inventive system.

The horizontal spacing between slats or bars of grate 106, and the distance between the gutter of street 104 and sidewalk 102 into which grate 106 is placed, blocks some larger trash items, such as parts of blown automobile tires, tree branches, and larger drinking cups, from entering storm drain 100. The remainder, indicated by the arrow labeled "flow" in FIG. 1, includes water and oil and trash carried along with the water. (Some of slats of grate 106 are cut off in the foreground of FIG. 1, to show the flow more clearly.)

In the inventive system shown in FIG. 1, the resulting mixed flow enters storm drain 100 and passes over perforated plate 110, which is made of a non-corrosive material. The perforations in plate 110 consist, in one embodiment, of staggered rows of elongated slits 112, perhaps 1–2 mm. wide and about 5 cm. long. Arrangement alternative to slits 112 are possible, such as through the use of holes or wired grids. Handle 114 is affixed to plate 110, such as made of a similar material as plate 110 or molded as part of plate 110.

Figure 2:
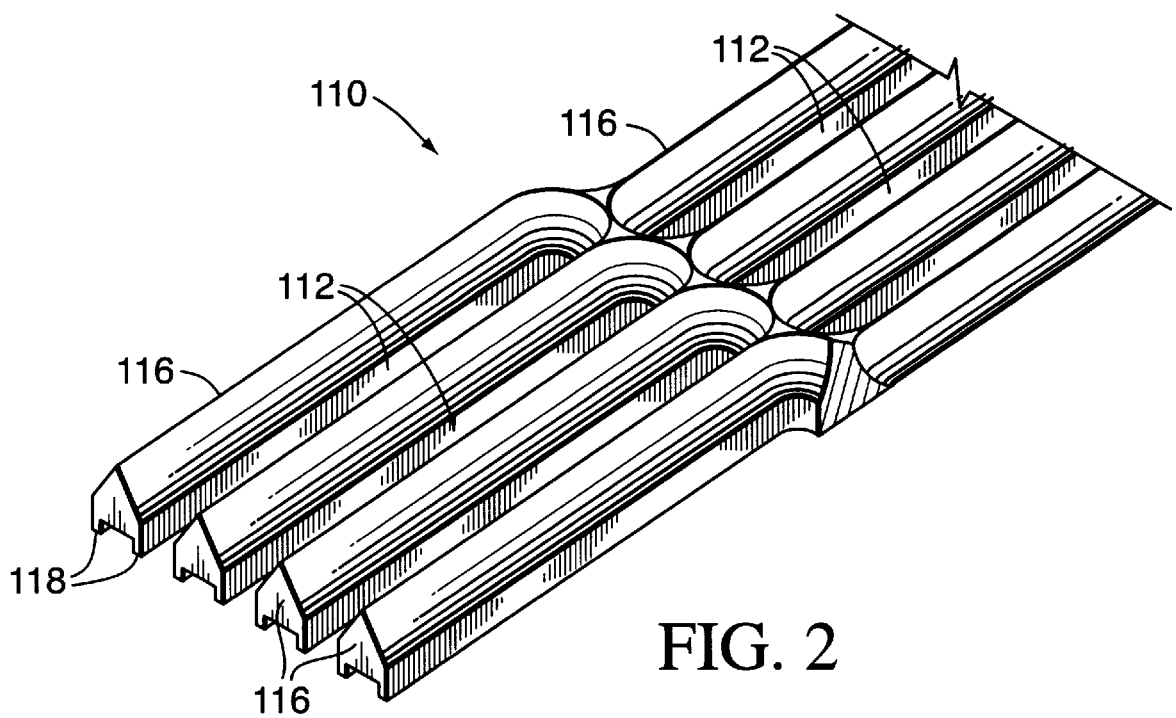
FIG. 2 is a perspective view of a cut-away portion of a plate that is part of the inventive system.

FIG. 2 shows details of the embodiment of the plate 110 discussed just above. FIG. 2 is a cut-away view, so only parts of each slit 112 is shown. Adjacent rows of elongated slits 112 are offset by half a pitch from each other. The offset creates irregular surfaces in between the rows that assist in interrupting the momentum of the liquid passing over the surface of plate 110, to promote the liquid dropping through plate 110.

Between slits 112 in the embodiment of FIG. 2 are bars 116 with pointed or small-radius rounded upper edges. Bars 116 do not have flat surfaces in the embodiment of FIG. 2, to further assist in causing the liquid to drop through slits 112. The undersides of bars 118 contain drip lips 118, one surrounding each of slits 112, which prevent the liquid from flowing along the bottom surface of plate 110.

Plate 110 is held in a slanted position by bracket 120 (see FIG. 1), between lip or rail 122 and lip 124 of grate 106. Bracket 120 is, in turn, attached to the storm drain together with grate 106, such as by bolts or the like, and may be retrofitted. In any event, it is preferred that plate 110 be removable from bracket 120, by use of handle 114. Plate 110 and bracket 120 can be made of steel or another suitably durable and strong material.

After the flow enters storm drain 100, it reaches plate 110, moving in a direction generally perpendicular to street 104 and at a downward angle. Water and oil suspended therein mostly fall through slits or holes 112, while trash will pass down the slanted surface of plate 110, for collection in basket 130. Rail 122 may not extend above the lower edge of the upper surface of plate 110, as shown in FIG. 1. Or, rail 122 may be tapered (not shown) or have a gap to assist in guiding trash to the entrance to basket 130. Alternatively, basket 130, or an array of baskets, can extend along the entire lower edge of rail 122.

In use, basket 130 will collect trash of sizes larger than the width of slits 112 but smaller than the spacing between slats of grate 106. Basket 130 is removably attached to rail 122, so basket 130 can be installed and emptied easily. Basket 130 can be manufactured of any suitable material, such as wire mesh, plastic, or fabric with a wire or otherwise stiffened rim.

During storms surges or at other high-flow times, the flow through grate 106 will be so high and be moving fast enough that much of the storm water will flow over plate 110 and through or over basket 130, directly into storm drain 100. This is not undesirable, however, because such bypass reduces the chance of damage to the equipment, and little additional oil or trash will be included in the main part of the storm surge. It is desired, though, to fabricate basket 130 of a water-permeable material, such as the preferred wire mesh.

Further shown in FIG. 1 is corrugated canister 140. (Part of plate 110 is cut away to show canister 140 more clearly.) Fluid flowing through plate 110 is funneled by the upper surface of bracket 120 into the open top of canister 140.

Canister 140 contains a multitude of bodies 142 of a material that entraps and encapsulates oil, discussed further below.

In a preferred embodiment, canister 140 is rectangular, measuring about 20 cm. deep, 30 cm. wide, and about 75 cm. long. Although FIG. 1 shows a rectangular canister 140 with rounded corners, other configurations are also possible. Canister 140 can be sized to fit the catchbasin.

The corrugated sides of canister 140 are made of a rigid polyethylene material. The corrugations permit a certain amount of expansion and allow canister 140 to be flexible along its length. During servicing, canister 140 is lifted from bracket 120 and removed from storm drain 100 through the hole left after the removal of grate 106. At these times, canister 140 must be bent practically in an L-shape. The corrugations permit easy removal for servicing, despite difficult geometry of many storm drains.

Canister 140 can be flared at the top, so that it is suspended from but does not fall through bracket 120. For example, a metal ring (not shown) can be fashioned slightly larger than the bottom hole in bracket 120 and fed through an overlapped section of the material of canister 140, like a belt through pants loops or the string on a laundry bag. The metal ring can be substantially rigid and can be seated in a groove with a gasket just next to the bottom hole of bracket 120. Another example uses a wedge-shaped upper lip (not shown) fashioned of plastic or metal. In such an arrangement, the smaller, lower end of the wedge seats against the rim of the bottom hole of bracket 120, while the fatter, upper end of the wedge protrudes above and cannot pass through the hole. Such an arrangement improves the chance of a non-gapping contact around the entire rim.

One or more handles 144 can be fastened to canister 140, to assist in easy removal. Bottom 146 of canister 140 is made of a mesh or other liquid-permeable material, so water can pass therethrough. The same material used in canister 140 can be used for the mesh of bottom 146. Multiple plates 120, each with a canister 140, can be placed side-by-side, in a modular fashion.

Diffuser plates 148 can be placed between quantities of copolymer bodies 142. Plates 148 may be detached from the sides of corrugated canister 140. Plates 148 can be formed of plastic, for example, and contain a multitude of holes or small slits. The purpose of diffuser plates 148 is to defeat the propensity of the liquid flowing through canister 140 to collect in channels. The formation of channels is undesirable because much of the liquid in a channel will come into contact only with those of the bodies 142 that have previously absorbed oil.

When the storm flow, containing both oil and water, passes through plate 110 and comes into contact with the copolymer material contained inside canisters 140, the copolymer material will absorb and entrap the oil. Because the copolymer material is hydrophobic, however, it will not become water-logged, and the water will pass into storm drain 100. It has been found that suitable copolymer material can remain in contact with water for at least several months, and perhaps indefinitely, without releasing the oil or allowing oil to emulsify.

Figure 3:
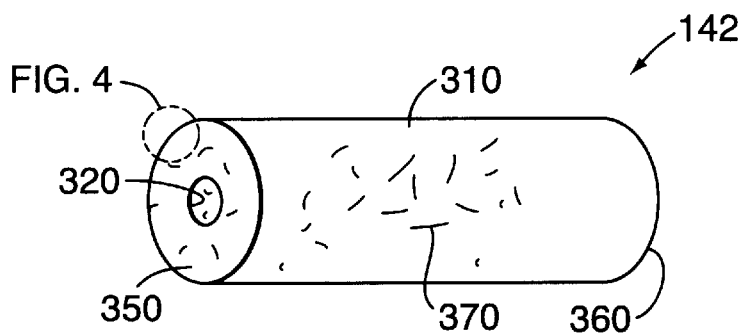
FIG. 3 is a perspective view of a preferred form of copolymer body used in the preferred sack shown in FIG. 1.

FIG. 3 shows an example of a suitably formed copolymer body 142, for use inside canister 140. The principal ingredient of bodies 142 is a copolymeric material that is known to sorb oil but not water. Preferably, the material is compliant or flexible.

As oil enters bodies 142, they expand somewhat. Thus, it is preferred to avoid filling canister 140 completely with bodies 142, to prevent bodies 142 from pushing upwards into bracket 120 as they expand.

Particularly suitable types of copolymers fall within the class of thermoplastic elastomers, such as styrene-butadiene-styrene ("SBS"), which is a styrenic block copolymer. Styrenic block copolymers were developed for applications that require impact resistance, and this is still their primary use. SBS is highly sorbent, non-toxic, and remains coherent after it is oil saturated. An alternative styrenic block copolymer is styrene-isoprene-styrene ("SIS").

In a preferred embodiment formed in accordance with the preferred process described below, SBS material formed into granules is mixed with granulated binder material. In that embodiment, granular porous SBS with about 30% styrene has been found suitable, when sifted to retain particles in the range of sizes between 4 and 24 mesh. Preferably, the SBS product is manufactured without talc, contrary to the standard manufacturing process, to enhance inter-granular linking or bonding in the formed body.

The binder material is a compliant or flexible, hydrophobic, olefinic polymer material in a granular form and having a melting point lower than that of the oil-absorbent copolymer. Polyolefin thermoplastic elastomers, such as ethylene propylene ("EP") rubber or ethylene propylene with a diene monomer ("EPDM") have been found suitable. The binder prevents formed bodies 142 from crumbling while being handled in dry form, yet also absorbs a certain quantity of oil. In a preferred embodiment, EPDM granules sifted to retain particles between 12 and 24 mesh were found suitable.

About 70–90% by weight of the material of bodies 142 consists of SBS and the remainder of EPDM binder. As explained below, SBS and EPDM granules are mixed and formed into bodies 142 in a way that results in SBS granules in an EPDM matrix.

In this context, the bodies 142 are piled on top of each other. It is desired that they not be too compactly packed inside canister 140, because that may restrict the flow of water. Thus, it is preferred to use a relatively large size for bodies 142.

However, large bodies result in a greater distance between outer surface 310 and center surface 320, which is disadvantageous. First, oil would require a much longer time of exposure to soak into material in the center, and when passing through the column of bodies in canister 140, a particular quantity of oil may encounter any particular body 142 only sporadically. Second, the problem is worse because of another undesired effect, called "matting" or "gel blocking," in which the first quantity of absorbed oil combines with an outer layer of grains in body 142 to form a barrier, preventing unabsorbed oil from continuing into the body 142 to reach inner layers of grains and be absorbed thereby. Thus, in a larger body, center material can largely remain unused.

A preferred embodiment permits use of a relatively large body, preserving water flow, while avoiding the problems arising from low encounter rates and gel blocking. A tube shape is used for bodies 142. For example, a cylinder with an outer diameter from about two to five centimeters has an hole about five to ten millimeters in diameter along the longitudinal axis, resulting in a body 142 that has all of its material less than about a centimeter or two from the nearest surface.

The relatively large inner hole allows water and oil to pass through and between the bodies 142 easily, thereby improving the chances of oil encountering a copolymer surface. Also, removal of material from the center of body 142 reduces the amount of material in each body, without significantly reducing the quantity of oil absorbed, which further improves the quantity of oil entrapped per unit quantity of copolymer. The random orientation of the inner holes also moves the liquid laterally in canister 140, thereby further reducing the tendency of the liquid to collect into channels.

Bodies 142 can be supplemented with different-shaped bodies in canisters 140. Using such a mixture of shapes is advantageous over the use of a uniform shape, because regular-shaped bodies can become arranged in a more fitted-together fashion, reducing the quantity of interstitial space, which thereby lowers the encounter rate.

The generally cylindrical exterior 310 of bodies 142 is preferred, as it reduces the area of contact between adjacent bodies 142. The pressure from many bodies 142 in canister 140 and the softness of the constituent materials tends to meld bodies 142 together, with the consequential tendency to lower the water-flow and encounter rates. A reduced contact area counters these undesired effect.

To permit faster oil absorption and less gel blocking, without increasing the distance from surface to center, it is desirable to avoid smooth exterior "skins" on inner and outer surfaces 310 and 320 or end surfaces 350 and 360. The preferred process of formation discussed below promotes this goal. Alternatively, cutting or stamping bodies 142 from sheets of molded material has been found to maintain porosity of surfaces 310, 320, while first cutting the sheets from blocks maintains porosity of surfaces 350, 360.

Figure 4:
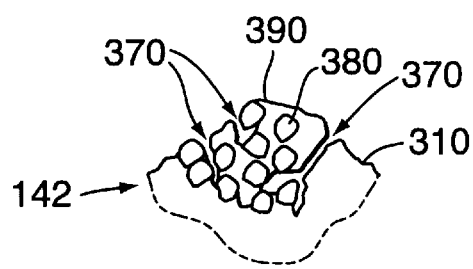
FIG. 4 is a detail view of a cross-section of the preferred body, such the one shown in FIG. 3.

Also to reduce gel blocking, bodies 142 preferably have numerous fissures 370 extending into bodies 142 from some or all exterior surfaces and passing between the grains of SBS, as illustrated in FIG. 4. Such fissures increase the effective surface area of bodies 142 while still maintaining the body as a coherent whole, permitting easy handling. The preferred formation process discussed below promotes this goal.

In one example, a body 142 measuring about 4 cm. across and about 7 cm. long, with a 1 cm. diameter axial hole, was found suitable. That body 142 was formed of 78% SBS and 22% EPDM and had a bulk density of about 0.6 g/cc and weighed about 35 grams. Such bodies can absorb up to 10 times their weight in oil.

The bulk density of the resulting body is controlled, also to reduce gel blocking. With the preferred bulk density, the SBS granules in bodies 142 are also less likely to clump to each other when soaked with oil, which also improves sorbency. Similarly, the SBS grain sizes identified above are selected to avoid gel blocking from either overly large chunks or agglomerated small-diameter, powdery particles.

With the preferred materials discussed above, bulk density greater than 0.75 g/cc tend to prevent the oil from entering the bodies, while bulk density smaller than 0.35 g/cc cause the bodies to fragment, either when dry or after absorbing oil. For example, copolymer bodies with a bulk density in the preferred range have enough inter-granular voids to permit oil to penetrate substantially throughout the thickness of bodies 142, thereby avoiding gel blocking, while remaining intact.

One method of forming bodies 142 applies a modified extrusion process. SBS and EPDM granules are placed in the hopper of an extruder of conventional design, for example, a two-inch Bonnot lab extruder with a hot-water external barrel heater. The extruder heats the granular material to a temperature not exceeding 120° F., far below normal extrusion temperatures for plastic products, and preferably about 105° F.

In the barrel of the extruder, the EPDM quickly become softened, as a result of heat, pressure, and mechanical agitation by the screw and barrel in combination. The extruder's screw mixes the softened EPDM and the SBS, forming a matrix of EPDM surrounding and interlinked to SBS granules. Because the SBS is not melted, some air bubbles remain in the mixture. The softening process occurs quite rapidly in the extruder, permitting very short dwell times (such as less than one minute), which permits rapid manufacturing.

The composite material is pressed through a circular die with a central rod or mandrel, at a flow rate of about 6 g/sec., to form the cylindrical body with axial hole shown in FIG. 3. In one example, a 10 cm. long die was used.

Upon passing through the die, the SBS granules, which have been compressed somewhat by being forced through the die, re-expand, "fluffing" the extruded material while it slowly cools. The expansion is further assisted by air remaining in the mixture. The extruded material is cut into suitable lengths to form the final bodies 142. As it slowly cools outside the extruder, the granules continue to expand for a time, causing additional fluffing.

The EPDM matrix 390 (see FIG. 3) forms a durable but permeable structure for the SBS granules 380 and provides mechanical integrity to resulting bodies 142. Thus, bodies 142 formed in accordance with the preferred method do not break or crack absent extreme elastic deformation, despite the presence of fissures 370. Also, fragments of such bodies do not detach easily in the form of flakes, crumbles, or dust, even with rough handling.

The fluffing effect (typically undesired in extrusion processes) is beneficial because it forms inter-granular fissures 370 in the EPDM matrix, throughout the structure. However, the fissuring is not so great as to cause loss of structural integrity. As noted above, fissures are preferred to facilitate rapid passage of oil into bodies 142 and to reduce the incidence of gel blocking, permitting continued absorption.

Alternatively, smaller pieces can be cut from the extruded material, while retaining the fluffing effect, resulting in bodies 142 that have the size and general appearance of popcorn. Another way of producing such smaller pieces is to use a smaller die, with a hole approximately one centimeter across, to produce popcorn-sized pieces directly.

Although the invention has been described with reference to specific embodiments, many modifications and variations of such embodiments can be made without departing from the innovative concepts disclosed. Thus, it is understood by those skilled in the art that alternative forms and embodiments of the invention can be devised without departing from its spirit and scope.

We claim:

1. A device for filtering oil and trash from storm water passing through a curb inlet comprising:
   (a) a perforated plate oriented substantially away from a horizontal plane and having a lower edge;
   (b) an open-topped basket coupled to and extending beyond the lower edge of the plate;
   (c) a canister under the plate; and
   (d) an oil-sorbent filter medium in the canister.

2. The device of claim 1 wherein the canister has flexible sides.

3. The device of claim 1 wherein the canister has corrugated sides.

4. The device of claim 4 wherein the canister is comprised of a polyethylene plastic material.

5. The device of claim 1 wherein the canister has a mesh bottom.

6. The device of claim 1 wherein the canister has a flared top.

7. The device of claim 1 wherein the plate is perforated with a multitude of elongated slits.

8. The device of claim 7 wherein the plate is perforated with slits oriented perpendicular to the lower edge.

9. The device of claim 7 wherein the plate is perforated with a plurality of staggered rows of the elongated slits.

10. The device of claim 7 wherein the surface in areas of the plate between adjacent pairs of the slits are not flat with respect to the plate.

11. The device of claim 10 wherein the plate further comprises drip lips surrounding the elongated slits on a bottom of the plate.

12. The device of claim 1 further comprising at least one perforated diffuser plate in the canister separating quantities of the filter medium.

13. The device of claim 1 wherein the basket is comprised of wire mesh.

14. The device of claim 1 further comprising a handle coupled to the plate.

15. The device of claim 1 wherein the filter medium comprises a hydrophobic thermoplastic elastomer.

16. The device of claim 15 wherein the filter medium comprises a multitude of elastomer bodies having a generally cylindrical exterior surface and surrounding an axial hole.

17. The device of claim 16 wherein the filter medium further comprises another multitude of non-cylindrical elastomer bodies.

18. The device of claim 15 wherein the filter medium comprises a multitude of elastomer bodies, each comprised of a first multitude of SBS granules and a second multitude of EPDM granules agglomerated together.

19. The device of claim 18 wherein the multitude of elastomer bodies comprise the product formed by a low-temperature extrusion process.

20. A device for filtering oil and trash from storm water comprising the following coupled elements:
   (a) means for separating trash from a water flow passing through a curb inlet;
   (b) means for collecting trash; and
   (c) means for filtering oil from the water flow after the trash has been separated therefrom.

* * * * *